United States Patent
Sala

(10) Patent No.: US 10,597,116 B2
(45) Date of Patent: Mar. 24, 2020

(54) METHOD OF OPERATING ELECTRONIC TRANSMISSION

(71) Applicant: TIEN HSIN INDUSTRIES CO., LTD., Taichung (TW)

(72) Inventor: Alfredo Sala, Vedano al Lambro (IT)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 333 days.

(21) Appl. No.: 15/469,141

(22) Filed: Mar. 24, 2017

(65) Prior Publication Data

US 2018/0273140 A1    Sep. 27, 2018

(51) Int. Cl.
| | | |
|---|---|---|
| *B62M 25/08* | (2006.01) | |
| *H02J 7/00* | (2006.01) | |
| *B62J 99/00* | (2020.01) | |

(52) U.S. Cl.
CPC .......... *B62M 25/08* (2013.01); *H02J 7/0047* (2013.01); *H02J 7/0063* (2013.01); *B62J 2099/004* (2013.01); *H02J 2007/005* (2013.01); *H02J 2007/0067* (2013.01)

(58) Field of Classification Search
CPC ...... B62M 25/08; H02J 7/0047; H02J 7/0063; H02J 2007/005; H02J 2007/0067; B62J 2099/004
USPC ....................................................... 307/9.1
See application file for complete search history.

(56) References Cited

U.S. PATENT DOCUMENTS

| 6,047,230 A | 4/2000 | Spencer | |
|---|---|---|---|
| 2016/0101827 A1* | 4/2016 | Usui ..................... | B62M 25/08 701/51 |

FOREIGN PATENT DOCUMENTS

| CN | 1506265 A | 6/2004 |
|---|---|---|
| CN | 101420567 A | 4/2009 |
| CN | 103723238 A | 4/2014 |
| CN | 104033588 A | 9/2014 |
| CN | 104290656 A | 1/2015 |

(Continued)

OTHER PUBLICATIONS

Chinese Office Action for CN201710004822.0, dated Jul. 2, 2019, Total of 5 pages.

(Continued)

*Primary Examiner* — Hal Kaplan
(74) *Attorney, Agent, or Firm* — R. Lynette Wylie; Apex Juris, pllc.

(57) ABSTRACT

A method of operating an electronic transmission is disclosed, including the following steps. First, turn on the electronic transmission, initialize settings, and perform as an operating mode. Next, detect whether a setup command, a shifting command, or a shutdown command is received. If the setup command is received, perform as the setup mode; if the shifting command is received, perform shifting; if the shutdown command is received, shut down the electronic transmission. If none of the commands is received for a predetermined period, detect whether a standby function is executed. If the function is not executed, shut down the electronic transmission; if the function is executed, perform as a standby mode, and detect whether to receive any command in a less energy consumption manner. If any command is received, return to perform as the operating mode whereby the method protects, including sustaining the power supply.

23 Claims, 6 Drawing Sheets

(56) References Cited

FOREIGN PATENT DOCUMENTS

CN 106064663 A 11/2016
CN 106080948 A 11/2016

OTHER PUBLICATIONS

English Abstract for corresponding document EP1426284 to CN1506265, Total of 1 page.
English Abstract for CN101420567, Total of 1 page.
English Abstract for CN103723238, Total of 1 page.
English Abstract for CN104033588, Total of 1 page.
English Abstract for CN104290656, Total of 1 page.
English Abstract for CN106064663, Total of 1 page.
English Abstract for CN106080948, Total of 1 page.

* cited by examiner

METHOD OF OPERATING ELECTRONIC TRANSMISSION

BACKGROUND OF THE INVENTION

1. Technical Field

The present invention relates generally to a bicycle transmission system, and more particularly to a method of operating an electronic transmission.

2. Description of Related Art

In recent years, bicycles are used increasingly in competitions, sports, and commutes. In response to terrain changes or the demand for physical deployment, a bicycle rider would use a transmission to adjust the ratio of a chain meshing the front gear and the rear gear.

A conventional transmission is usually driven to move by pulling a cable through a lever on the handle. However, after a prolonged use, the cable may not able to move the transmission to a predetermined position due to aging and slack. In addition, some riders may accidentally move the lever to an inappropriate position because of being unfamiliar with the mechanically moving magnitude of the lever, and thus the chain would not be able to mesh the gear to the accurate position effectively. In the above situations, the transmission may not operate smoothly; furthermore, the chain may fall off from the gear and cause danger.

Therefore, in order to improve the aforementioned shortcomings, manufacturers have developed an electronic transmission which can be driven by receiving a shift electronic signal that is sent by pressing buttons on the lever. After receiving the electrical signal, the electronic transmission will move the chain to a preset position according to the content of the electrical signal. In this sense, the cable can avoid aging. Moreover, a rider only has to press the buttons according to his/her demand rather than manually adjusting a mechanical structure, and thus the chain could avoid falling off from the gear due to improper operation.

In addition, the power required by a main body of the electronic transmission is provided by an additional power supply. For preventing an abnormal operation resulting from insufficient voltage, multiple switches are normally provided in the electronic transmission. When the electronic transmission operates, in order to make sure the power can be supplied to the main body properly, the switches are controllable for adjusting the power respectively due to the use of different conditions. Such design with switches is helpful to properly supply the power and protect the power supply, but the circuit design would become too complicated, which could impact the stability of the electronic transmission during the operation. Therefore, the method of operating the conventional electronic transmission is still too complex to operate, and there is still room for improvement.

BRIEF SUMMARY OF THE INVENTION

In view of the above, the primary objective of the present disclosure is to provide a method of operating an electronic transmission, which can not only prevent any problems during the operating process by simple determinations and actions, but also maintain stable power supplying and ensure the lifetime of the power supply.

The present disclosure provides a method of operating an electronic transmission, includes the steps of: turning on the electronic transmission, and initializing settings; after initializing settings, performing as an operating mode; wherein in the operating mode, detecting whether a setup command, a shifting command, or a shutdown command is received; if the setup command is received, exiting the operating mode, and performing as the setup mode; if the shifting command is received, exiting the operating mode, and performing shifting; if the shutdown command is received, shutting down the electronic transmission; wherein in the operating mode, if none of the shutdown command, the shifting command, or the setup command has received for a predetermined period, detecting whether a standby function is executed; if the standby function is not executed, shutting down the electronic transmission; if the standby function is executed, performing as a standby mode; wherein in the standby mode, detecting whether to receive any command, which consumes energy that is less than the energy consumed in the operating mode; if any command is received, exiting the standby mode, and returning to perform as the operating mode.

The present disclosure further provides a method of operating an electronic transmission, wherein the electronic transmission comprises a transmission main body and a transmission power supply to provide the transmission main body with the power required for operation. The method comprises the steps of: turning on the electronic transmission, and initializing settings; performing as an operating mode; detecting whether a shutdown command, a setup command, or a shifting command is received; performing the following steps according to the received command: if the shutdown command is received, shutting down the electronic transmission; if the setup command is received, exiting the operating mode, and performing as the setup mode; wherein during performing as the operating mode, detecting whether to receive a command for exiting the setup mode; if said command is received, exiting the setup mode, and returning to perform as the operating mode; if said command is not received, detecting whether no any command has received for a predetermined period; wherein if a period for which no command has received has not yet exceeded the predetermined period, continuing performing as the setup mode; if the period has already exceeded the predetermined period, detecting whether a standby function is executed; wherein if the standby function is not executed, shutting down the electronic transmission; if the standby function is executed, exiting the setup mode, and performing as the standby mode; wherein in the standby mode, detecting whether to receive any command, which consumes energy that is less than the energy consumed in the operating mode; if any command is not received, continuing performing as the standby mode; if any command is received, exiting the standby mode, and returning to perform as the operating mode; if the shifting command is received, detecting a voltage of the transmission power supply, and then determining whether the voltage of the transmission power supply is greater than a minimum reference voltage; if the voltage is greater than the minimum reference voltage, controlling the transmission main body to operate based on the shifting command; if the voltage is less than the minimum reference voltage, detecting whether the shutdown command is received within a predetermined period without controlling the transmission main body to operate; wherein if the shutdown command is received, shutting down the electronic transmission; if the shutdown command is not received, detecting whether the standby function is executed; wherein if the standby function is not executed, shutting down the electronic transmission; if the standby function is executed, performing as the standby mode.

Whereby, the abovementioned methods of operating the electronic transmission can not only prevent problems which occurred by simple determinations and actions during the operating process, but also maintain stable power supply and ensure the lifetime of the power supply.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
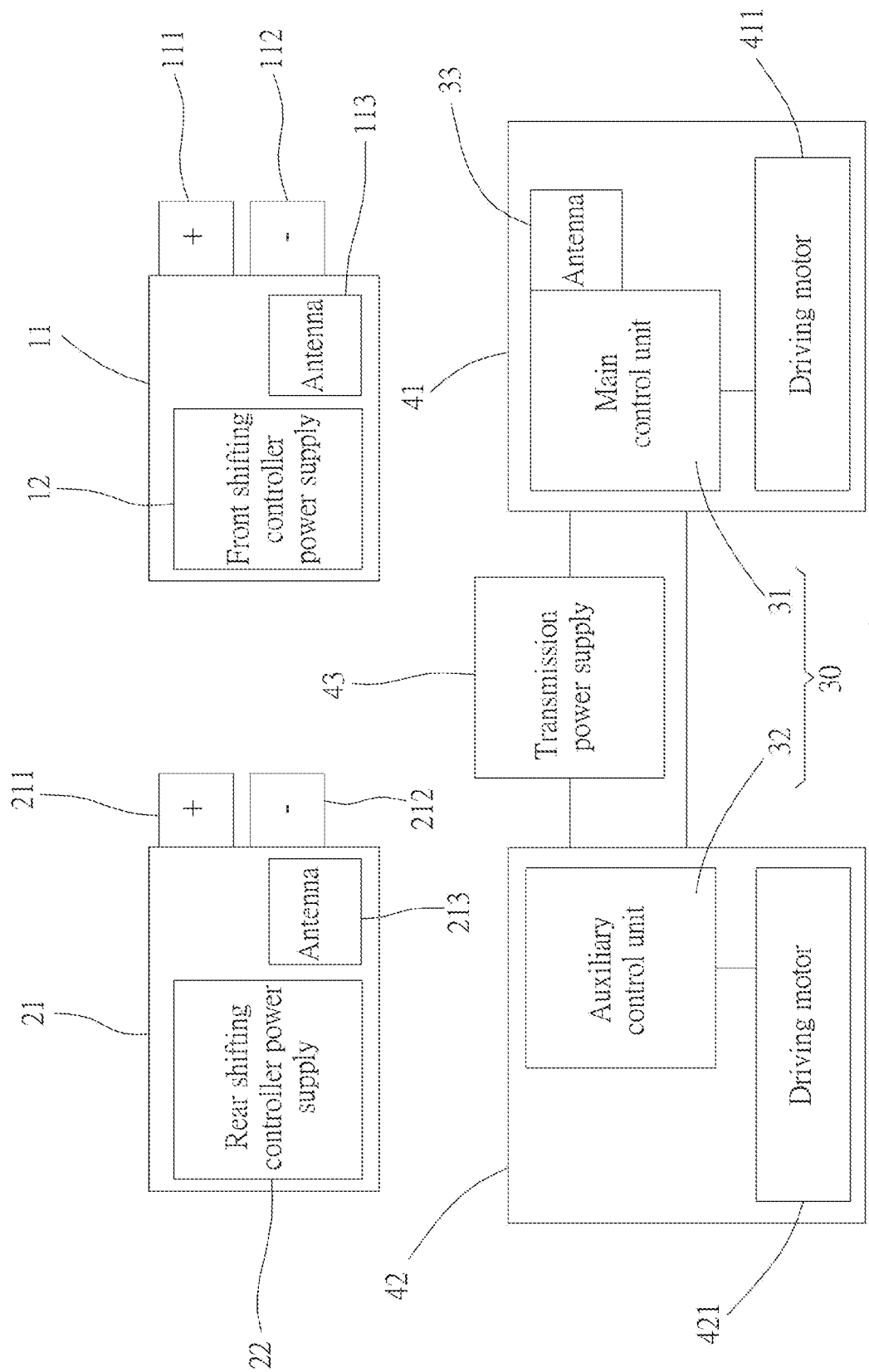
FIG. 1 is a schematic diagram of the electronic transmission operated by the embodiment of the present disclosure, showing the electrical connection within the electronic transmission.

As shown in FIG. 1, an electronic transmission operated by the embodiment of the present disclosure includes a front shifting controller 11, a front controller power supply 12, a rear shifting controller 21, a rear controller power supply 22, a central control module 30, a front transmission main body 41, a rear transmission main body 42, and a transmission power supply 43.

Both the front and the rear shifting controllers 11 and 21 include an upshift button 111, 211, a downshift button 112, 212, and an antenna 113, 213 respectively. If the upshift button 111, 211 or the downshift button 112, 212 is pressed, the corresponding front shifting controller 11 or rear shifting controller 21 would create a shifting command, and send the shifting command by a wireless signal through the antenna 113, 213. The front and the rear controller power supplies 12 and 22 in the present embodiment are CR2032 mercury batteries, and are respectively provided in the front and the rear shifting controllers 11 and 21, so as to provide the front and the rear shifting controllers 11 and 21 with the power which is required for operation. In practice, the shifting command can be sent by wired transmission. In addition, the front and the rear controller power supplies 12, 22 are not limited to mercury batteries, but also can be replaced by other types of power supply.

The central control module 30 includes a main control unit 31 and an auxiliary control unit 32 which are signal-connected, and integrally provided in the front transmission main body 41 and the rear transmission main body 42 respectively. Additionally, the main control unit 31 includes an antenna 33 to receive the shifting command which is sent by the antenna 113 of the front shifting controller 11 or the antenna 213 of the rear shifting controller 21.

The front and the rear transmission main bodies 41 and 42 respectively include driving motors 411 and 421, which are electrically connected to the main control unit 31 and the auxiliary control unit 32 respectively. With such design, after the main control unit 31 receives the shifting command which is sent by the front shifting controller 11 or the rear shifting controller 21, the main control unit 31 would control the driving motor 411, or instruct the auxiliary control unit 32 to control the driving motor 421 according to the content of the shifting command, so as to move the front transmission main body 41 or the rear transmission main body 42 to achieve the effect of shifting. The transmission power supply 43 in the present embodiment is a lithium battery, and is electrically connected to the front and the rear transmission main bodies 41, 42 to provide the central control module 30 and the driving motors 411, 421 with the power required for operation. Practically, the lithium battery can be replaced by a nickel-metal hydride battery or other types of power supply.

Figure 2A:
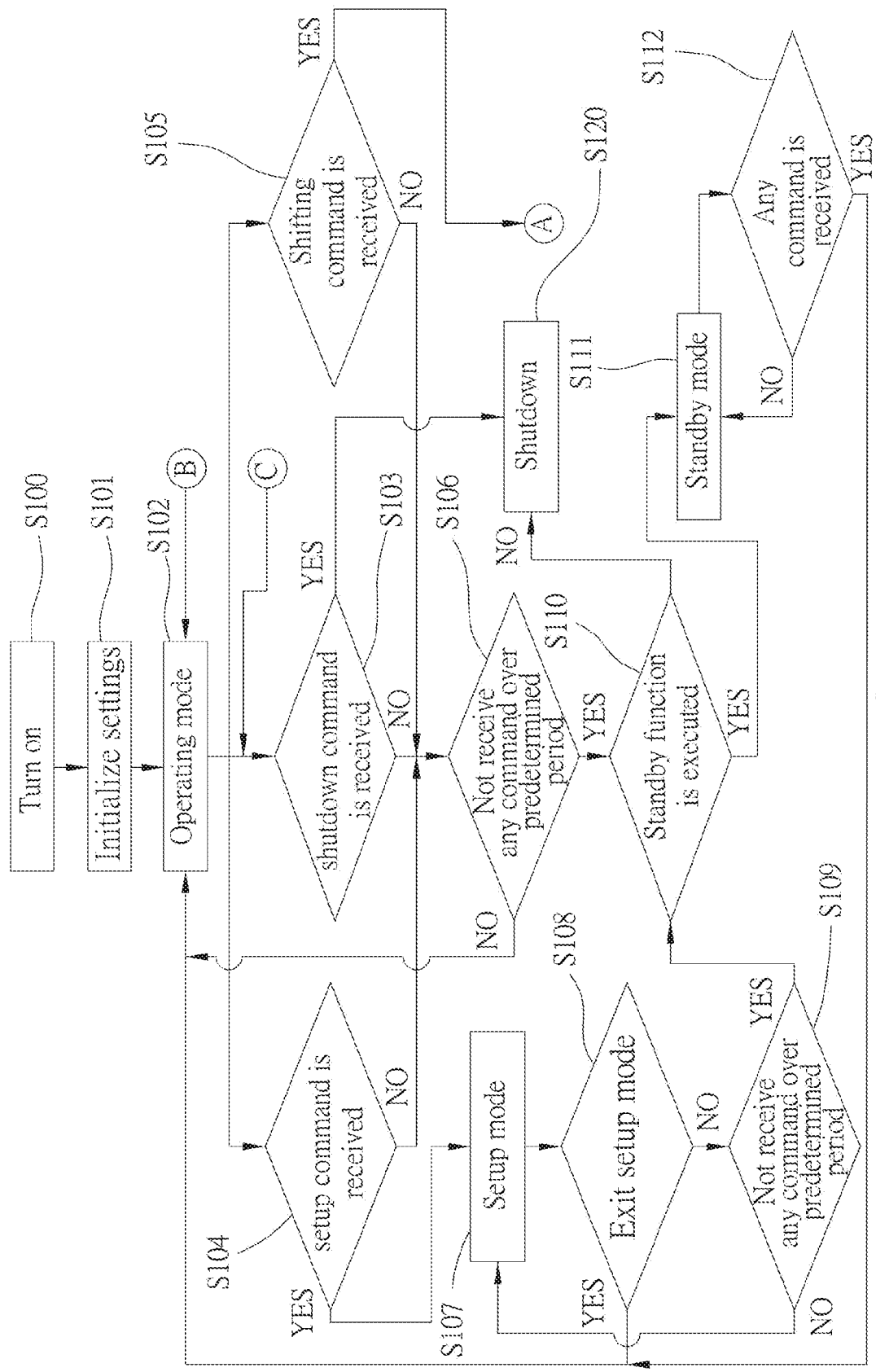
FIG. 2A and FIG. 2B are flow charts of the embodiment, showing the method of operating the electronic transmission.
Figure 2B:
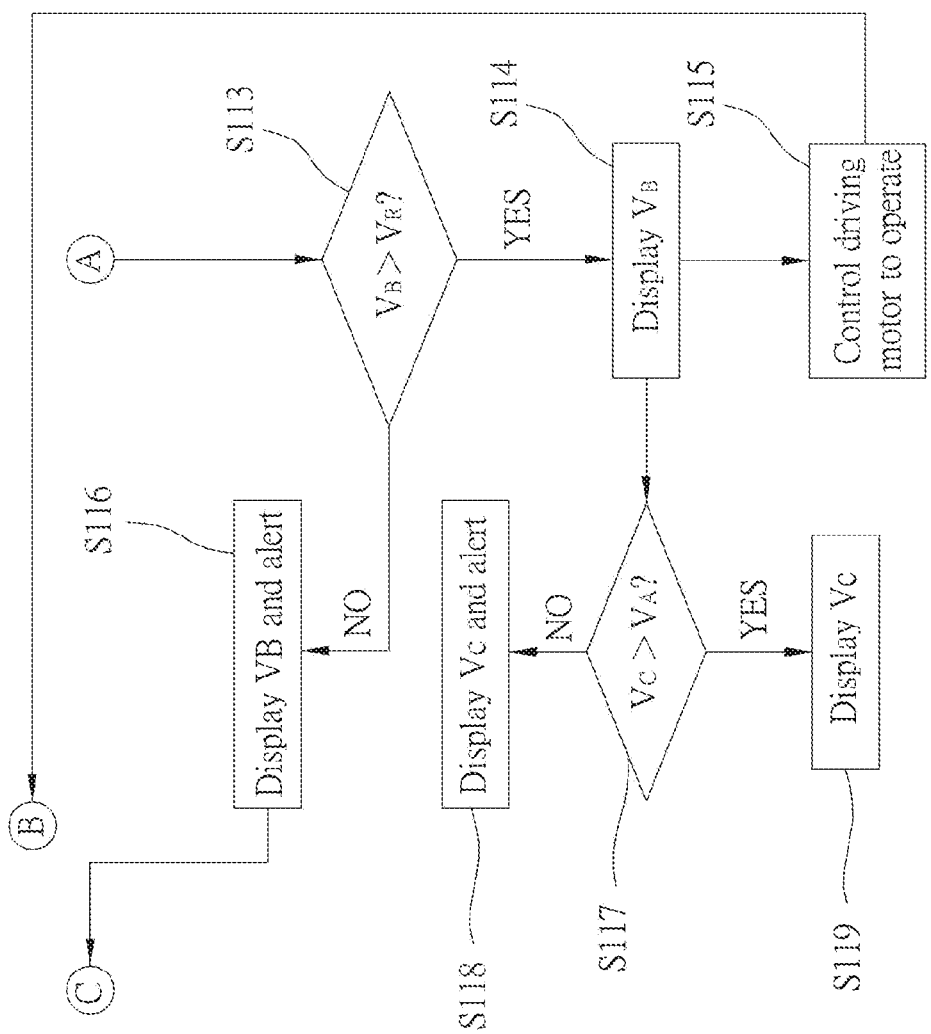

With the aforementioned circuit configuration, the central control module 30 of the electronic transmission controls other components by the operating method including the following steps shown in FIG. 2A and FIG. 2B.

At first, turning on the electronic transmission initializes settings of each component (steps S100 and S101). More specifically, the central control module 30 drives the front and the rear transmission main bodies 41, 42 to control the driving motors 411 and 421 thereof to detect the states of the driving motors 411 and 421, as well as current positions of the front and the rear transmission main bodies 41, 42, so as to confirm the current gear.

After initializing settings, the central control module 30 performs in an operating mode (step S102), and remains in a working state waiting for a command. At this time, the central control module 30 maintains a high-speed operating mode in order to respond to the command immediately.

During performing in the operating mode, the central control module 30 detects whether a shutdown command, the shifting command, or setup commands are received (steps S103 to S105), wherein the setup commands are any commands other than the shutdown command and the shifting command. In more detail, according to operational needs, the setup commands mainly include general setup commands and a correction command as well as other types of commands. Thereafter, the central control module 30 will perform the following steps according to the received command.

If the central control module 30 receives the shutdown command (step S103), shut down the electronic transmission (step S120).

If the central control module 30 receives the setup command, exit the operating mode, and perform in the corresponding setup mode, e.g., general setup mode and correction mode (step S107). In addition, a user can determine whether to execute a standby function or not in the setup mode. During performing the setup mode, the central control module 30 detects whether to receive a command for exiting the setup mode (step S108). If such command is received, exit the setup mode, and resume the operating mode (step S102); if such command is not received, control module 30 detects whether the central control module 30 has not received any command for a predetermined period (step S109). If the period for which the central control module 30 has not received any command has not yet exceeded the predetermined period, continue performing in the setup mode (step S107), while if the period has already exceeded the predetermined period, the central control module 30 detects whether the standby function is executed (step S110). If the standby function is not executed, shut down the electronic transmission (step S120); if the standby function is executed, standby mode (step S111) resumes, and the central control module detects whether to receive any command, which consumes less energy than the energy consumed in the operating mode (step S112) by deducing the operating frequency or the radio emission frequency of the central control module 30 for reducing energy consumption. If no command is received, continue performing in the standby mode (step S111); if any command is received, exit the standby mode, and perform in the operating mode (step S102) resumes.

In addition, during performing in the operating mode (step S102), if the central control module 30 has not received any command over a predetermined period (step S106), the central control module 30 detects whether the standby function is executed (step S111). If the standby function is not executed, shut down the electronic transmission (step S120); if the standby function is executed, resume standby mode, and detect whether any command is received, which consumes less energy than consumed in the operating mode (step S112).

In conclusion, when the central control module 30 performs in the operating mode or the setup mode, the main control unit 31 or the auxiliary control unit 32 has to immediately and promptly detect the received signal, or to drive the motor or other components, which makes the central control module 30 continue to calculate in a state of full efficiency, and makes the transmission power supply 43 maintain state of high power consumption. Accordingly, the purpose of the above steps is to prevent the transmission power supply 43 from being depleted because a user forgets to shut down the central control module 30 or to exit setup mode. During performing in the operating mode or the setup mode, if the central control module 30 has not received any command over the predetermined period, which means a user forgets to exit the operating mode or the setup mode or forgets to shut down, the electronic transmission will be shut down, or further performs in the standby mode, in order to conserve power stored in the transmission power supply 43 to thereby effectively extend the lifetime of the transmission power supply 43.

Furthermore, as shown in FIG. 2B, if the shifting command sent from the front shifting controller 11 or the rear shifting controller 21 is received, test the voltage VB of the transmission power supply 43, and determine whether the voltage VB is greater than a minimum reference voltage VR (step S113), wherein the minimum reference voltage VR shall be preset according to manufacturer's test data, and shall be slightly greater than a voltage that is insufficient for the front shifting controller 41 or the rear shifting controller 42 to operate normally. Therefore, if the voltage VB is greater than the minimum reference voltage VR, the problem of power shortage will be avoided, and the main control unit 31 or the auxiliary control unit 32 of the central control module 30 controls the driving motor 411 or 421 of the front transmission main body 41 or rear transmission main body 42 based on the shifting command (step S115). If the voltage VB is less than the minimum reference voltage VR, the power may be insufficient for the driving motors 411, 421, or the transmission power supply 42 maybe damaged due to the continued power supply. In this situation, the central control module 30 will not control the driving motor 411, 421 of the front transmission main body 41 or the rear transmission main body 42, but detects whether the shutdown command is received within a predetermined period (step S103). If the shutdown command is not received, detect whether the standby function is executed (step S110). If the standby function is not executed, shut down the electronic transmission (step S120); if the standby function is executed, perform the standby mode (step S111) in order to extend the life of the transmission power supply 43. In contrast, if the shutdown command is received, shut down the electronic transmission (step S120). Additionally, in the current embodiment, for ensuring a normal life and operation of the transmission power supply 43, if the voltage VB is equal to the minimum reference voltage VR, the steps corresponding to the situation when the voltage VB is less than the minimum reference voltage VR are performed. However, in other embodiments, if the voltage VB is equal to the minimum reference voltage VR, the steps corresponding to the situation when the voltage VB is greater than the minimum reference voltage VR are performed.

The purpose of the above steps is to ensure that the central control module 30 will shut down the driving motor 411 or 421 of the front transmission main body 41 or the rear transmission main body 42 if the power is insufficient, so as to avoid any problems during the shifting process. In addition, the purpose of the steps corresponding to the situation when the voltage VB is less than the minimum reference voltage VR, i.e., the steps of not controlling the driving motor 411, 421 of the front transmission main body 41 or the rear transmission main body 42, but detecting whether the shutdown command is received, and determining whether the standby function is executed, is for reducing a charging duration in response to habits of users. More specifically, some bicycles are equipped with an energy generating equipment such as hub dynamo or solar power energy generator, and if the user encounters a power shortage during riding such bicycles, the transmission power supply 43 can still be charged by the abovementioned energy generating equipment. In this case, to avoid the electronic transmission from being shut down and booted repeatedly, if the shutdown command is not received, the central control module 30 will perform in the standby mode or subsequently the operating mode. In contrast, if the transmission power supply 43 has a power shortage when the bicycle is not being used, the user will usually shut down and charge the electronic transmission in order to ensure the transmission power supply 43 being fast charged by the energy generating equipment. Therefore, based on the aforementioned habits of users, the current embodiment designs that the central control module 30 shuts down the electronic transmission only if the tested power is insufficient, and the shutdown command is received for reducing the charging duration.

Moreover, if the voltage VB is less than the minimum reference voltage VR, alert the user that the power is insufficient by a warning signal (step S116) through a flashing light or buzzer sound generated from an additional equipment (not shown), and warn the user to charge or replace the transmission power supply 43 as soon as possible. However, in other embodiments, the ways of alerting the user that the power is insufficient are not limited to the light or sound.

In addition, to let users know the operating status of the transmission power supply 43 during the shifting process, after testing the voltage $V_B$ of the transmission power supply 43, display the voltage $V_B$ to provide users for reference (steps S114 and S116). In other embodiments, after testing the voltage $V_B$ of the transmission power supply 43, the voltage $V_B$ can be displayed only if the voltage $V_B$ is less than the minimum reference voltage $V_R$.

Figure 3:
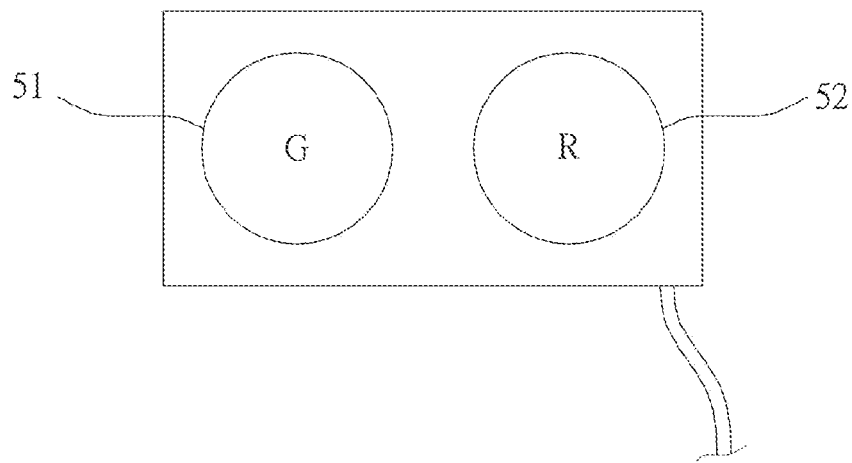
FIG. 3 is a partial schematic diagram of the electronic transmission, showing the red light and green light indicating the state of the power.

Practically, a number of lights with different colors can be additionally added to be electrically connected to the central control module 30, and emit different colors according to the tested voltage VB. For example, a green light 51 and the red light 52 shown in FIG. 3 can be installed. In this case, if the voltage VB of the transmission power supply 43 is greater than the minimum reference voltage VR, the green light 51 is driven to be emitted for informing users that the power is currently sufficient. In contrast, if the voltage VB of the transmission power supply 43 is less than the minimum reference voltage VR, the red light 52 is driven to be emitted for informing users that the power is currently insufficient, and promptly charging is necessary.

Figure 4:
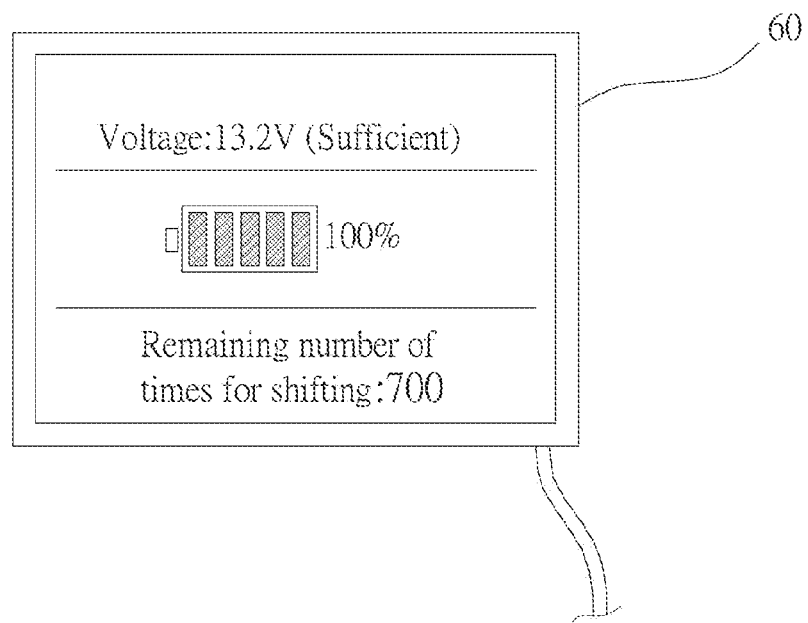
FIG. 4 is a partial schematic diagram of the electronic transmission, showing the displaying screen is used for indicating the state of the power.

Besides the use of lights, a display screen 60 shown in FIG. 4 can also be electrically connected to the central control module 30, wherein the display screen 60 can show text such as "sufficient voltage" and "please charge", the tested current voltage, voltage interval, percentage of electricity, or the calculated remaining number of times for shifting, in order to provide users for reference about the residual electricity. In other embodiments, other ways of displaying based on user's need can also be used for reference about the residual electricity.

Figure 5:
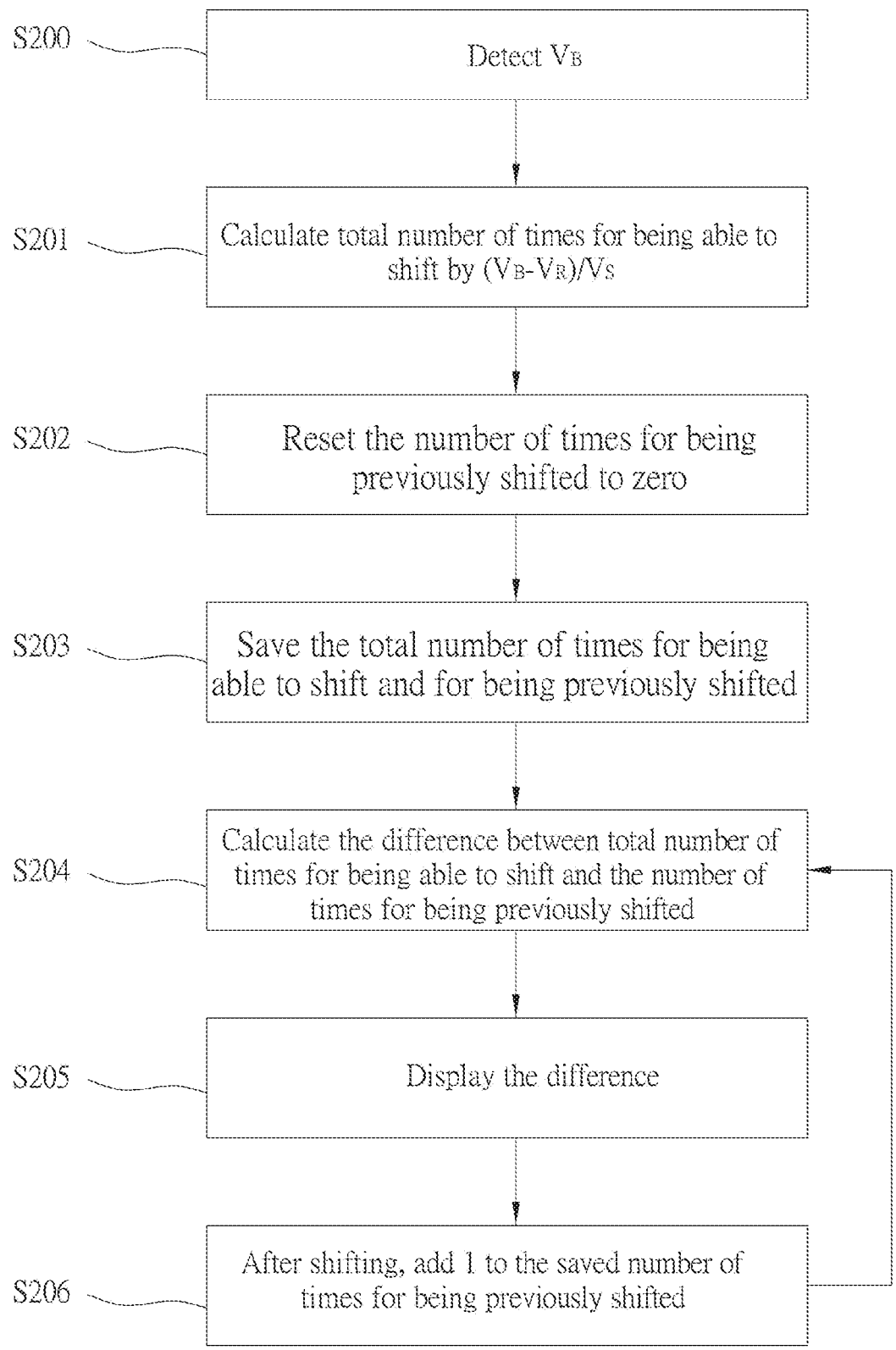
FIG. 5 is a flow chart of the embodiment, showing how the remaining number of times for shifting of the electronic transmission is calculated and displayed.

Furthermore, as shown in FIG. 5, the initial setting method for calculating the remaining number of times for shifting includes the following steps.

First, test the voltage $V_B$ of the transmission power supply 43 (step S200), and after confirming the voltage of the transmission power supply 43 is greater than the minimum reference voltage (i.e., the step of confirming the voltage of the transmission power supply in the aforementioned method of operating electronic transmission), calculate total number of times for being able to shift by the formula below (step S201):

$$(V_B - V_R)/V_S$$

$V_B$ is the tested voltage of the transmission power supply 43; $V_R$ is the minimum reference voltage value; $V_S$ is a preset voltage value that is supposed to be consumed in each shift.

For example, if the tested voltage $V_B$ of the transmission power supply 43 is 12.4 volts, and the minimum reference voltage $V_R$ is 11 volts, while the voltage value $V_S$ that is supposed to be consumed in each shift is 0.002 volts, the total number of times for being able to shift can thus be calculated by substituting the numbers into the formula above, which obtains (12.4−11)/0.02, and results in 700 times.

Afterward, reset the number of times for being previously shifted to zero (step S202), and then save the total number of times for being able to shift and the number of times for being previously shifted (step S203). Next, calculate the difference between the total number of times for being able to shift and the number of times for being previously shifted (step S204), and then display the difference on the display screen (step S205). Subsequently, before the electronic transmission is being shut down, when the user manipulates the electronic transmission for shifting again, the total number of times for being able to shift will be calculated by adding 1 to the saved number of times for being previously shifted (step S206) rather than checking the current voltage $V_B$. Afterward, calculate the difference between the total number of times for being able to shift and the number of times for being previously shifted again (step S204), and then display the calculated difference which represents the remaining number of times for shifting (step S205). Because the power consumed by counter operation is far less than the power consumed by the central control module 30 detecting the voltage again, the abovementioned method is helpful to effectively save the power consumed by the transmission power supply 43, in order to effectively extend the life of the transmission power supply 43.

In other embodiments, in order to accurately monitor the transmission power supply 43 and the remaining number of times for shifting, each time when the user manipulates the electronic transmission for shifting, the central control module 30 can also immediately test the voltage $V_B$, and calculate by the formula above with the minimum reference voltage $V_R$ and the preset voltage value $V_S$ that is supposed to be consumed in each shift.

Figure 6:
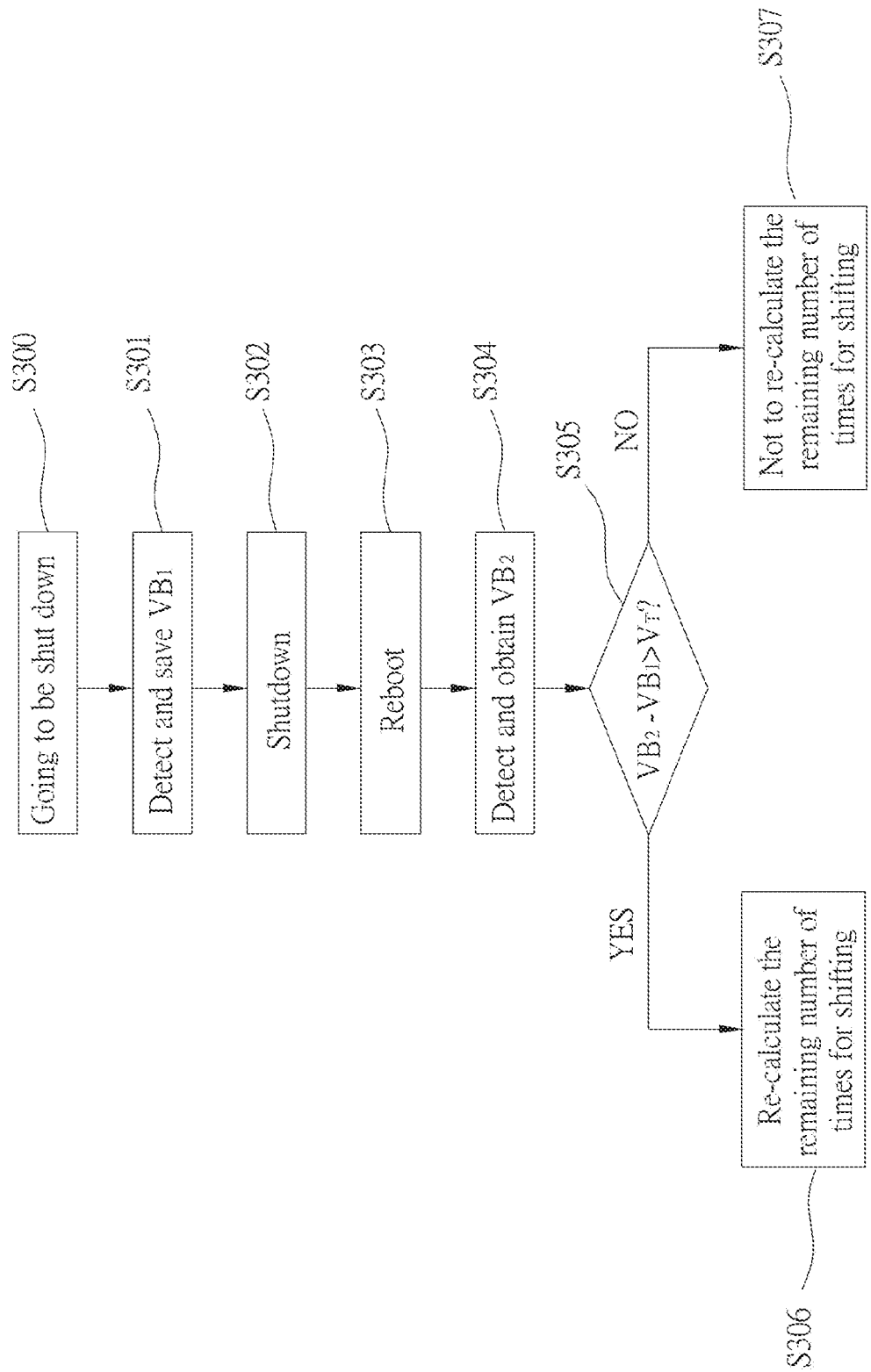
FIG. 6 is a flow chart showing the method of determining whether the power supply is charged.

In addition, for accurate monitoring, the method of the current disclosure further includes the steps of determining whether the power supply is charged or not as shown in FIG. 6 and described below.

First, each time when the electronic transmission is going to be shut down (step S300), detect and save the voltage value $VB_1$ of the transmission power supply 43 (step S301), and then shut down the electronic transmission (step S302). After rebooting the electronic transmission (step S303), detect and obtain a new voltage value $VB_2$ (step S304), and then determine whether the result of $VB_2$ (the voltage value after shutdown) minus $VB_1$ (the voltage value before shutdown) is greater than a rated voltage error $V_T$ (step S305). If the result is greater than the rated voltage error $V_T$, it is determined that charging has been performed. In this case, perform the steps of the initial setting method for calculating the remaining number of times for shifting as shown in FIG. 5 (step S306). In contrast, if the result is less than the rated voltage error $V_T$, it is determined that charging has not been performed, which results from environmental factors such as temperature. In this case, the aforementioned steps of the initial setting method for calculating the remaining number of times for shifting will not be performed (step S307).

For example, the voltage value $VB_1$ of the transmission power supply 43 tested before shutdown is 7.4 volts, and the rated voltage error is 0.2 volts. If the voltage value $VB_2$ after shutdown is 7.9 volts, the result of $VB_2$ minus $VB_1$ is 0.5 volts, and it is determined that charging has been performed, and thus the steps of calculating the remaining number of times for shifting will be performed. In contrast, if the voltage value $VB_2$ after shutdown is 7.5 volts, the result of $VB_2$ minus $VB_1$ is 0.1 volts, and it is determined that charging has not been performed, which results from environmental factors such as temperature, and thus the steps of calculating the remaining number of times for shifting will not be performed.

Furthermore, because the power required by the front and the rear shifting controller 11, 21 for generating signals has to be supplied by the front and the rear controller power supplies 12, 22, besides testing the voltage of the transmission power supply 43, the method of the current disclosure further includes the steps of testing and displaying the voltage $V_C$ of the controller power supply 12, 22 in the abovementioned ways such as showing lights, text, current voltage, voltage interval, and percentage of electricity (steps S118 and S119 shown in FIG. 2B). Whereby, users will realize the supplying status of the front and the rear controller power supplies 12, 22.

Moreover, after testing the voltage $V_C$ of the controller power supply 12, 22, determine whether the voltage $V_C$ is less than a warning voltage $V_A$ (step S117). If the voltage $V_C$ is less than the warning voltage $V_A$, generating a warning signal (step S118) such as red flashing light or buzzer sound generated from an additional equipment (not shown) to alert users that the voltage $V_C$ of the controller power supply 12, 22 is insufficient, and it is necessary to replace the controller power supply promptly. In the current embodiment, for ensuring a normal life and operation of the front and the rear controller power supplies 12, 22, if the voltage $V_C$ is equal to the warning voltage $V_A$, the warning signal will be generated. However, in other embodiments, if the voltage $V_C$ of the front and the rear controller power supply 12, 22 is equal to the warning voltage $V_A$, display the voltage $V_C$ of the front and the rear controller power supply 12, 22 without generating the warning signal.

By employing the abovementioned steps as currently disclosed, not only any problems during the operating process by simple determinations and actions can be prevented, but a normal life of the power supply may also be sustained. It must be pointed out that the above embodiments are only some preferred embodiments of the present disclosure. All equivalent methods and permutation which employ the concepts disclosed in this specification are included within the scope of the present disclosure and the appended claims.

What is claimed is:

1. A method of operating an electronic transmission; comprising the steps of:
    turning on the electronic transmission, and initializing settings; after initializing settings, performing in an operating mode;
    wherein in the operating mode, detecting whether a setup command, a shifting command, or a shutdown command is received; if the setup command is received, exiting the operating mode, and performing in the setup mode; if the shifting command is received, exiting the operating mode, and performing shifting; if the shutdown command is received, shutting down the electronic transmission;
    wherein in the operating mode, if the shutdown command, the shifting command, or the setup command is not received for a predetermined period, detecting whether a standby function is executed; if the standby function is not executed, shutting down the electronic transmission; if the standby function is executed, performing in a standby mode; and
    wherein in the standby mode, detecting whether any command is received, which consumes energy that is less than the energy consumed in the operating mode; and if said command is received, exiting the standby mode, and returning to perform in the operating mode.

2. The method of claim 1, further comprising the steps in the setup mode of:
    detecting whether a command for exiting the setup mode is received; if said command is received, exiting the setup mode, and returning to perform in the operating mode; if said command is not received, detecting whether no any command has been received for a predetermined period;
    wherein if a period for which no command has been received has not yet exceeded the predetermined period, continuing performing in the setup mode; if the period has already exceeded the predetermined period, detecting whether the standby function is executed; and
    wherein if the standby function is not executed, shutting down the electronic transmission; and if the standby function is executed, performing in the standby mode.

3. The method of claim 1, wherein the electronic transmission comprises a transmission main body and a transmission power supply to provide the transmission main body with power required for operation;
    wherein during performing shifting, detecting a voltage of the transmission power supply, and then determining whether the voltage of the transmission power supply is greater than a minimum reference voltage; if the voltage is greater than the minimum reference voltage, controlling the transmission main body to operate based on the shifting command; if the voltage is less than the minimum reference voltage, detecting whether the shutdown command is received within a predetermined period without controlling the transmission main body to operate;
    wherein if the shutdown command is received, shutting down the electronic transmission; if the shutdown command is not received, detecting whether the standby function is executed;
    wherein if the standby function is not executed, shutting down the electronic transmission; if the standby function is executed, performing in the standby mode.

4. The method of claim 3, further comprising the steps of:
    after detecting the voltage of the transmission power supply, displaying the voltage of the transmission power supply by a display element.

5. The method of claim 4, wherein the display element displays the voltage of the transmission power supply by showing lights, text, voltage value, voltage interval, percentage of electricity, or remaining number of times for shifting.

6. The method of claim 3, wherein if the voltage of the transmission power supply is equal to the minimum reference voltage, controlling the transmission main body to operate based on the shifting command.

7. The method of claim 3, wherein if the voltage of the transmission power supply is equal to the minimum reference voltage, determining whether the shutdown command is received without controlling the transmission main body to operate.

8. The method of claim 3, wherein if the voltage of the transmission power supply is not greater than the minimum reference voltage, generating a warning signal to inform a user that the voltage of the transmission power supply is insufficient.

9. The method of claim 3, wherein the electronic transmission further comprises a shifting controller for generating the shifting command, and a controller power supply for providing the shifting controller with power required for operation;
    wherein if the voltage of the transmission power supply is greater than the minimum reference voltage, detecting a voltage of the controller power supply, and determining whether the voltage of the controller power supply is less than a warning voltage;
    wherein if the voltage of the controller power supply is less than the warning voltage, generating a warning signal to inform a user that the voltage of the controller power supply is insufficient.

10. The method of claim 9, further comprising the steps of:
    after detecting the voltage of the controller power supply, displaying the voltage of the controller power supply by a display element.

11. The method of claim 10, wherein the display element displays the voltage of the controller power supply by showing lights, text, voltage value, voltage interval, percentage of electricity, or remaining number of times for shifting.

12. The method of claim 9, wherein if the voltage of the controller power supply is equal to the warning voltage, generating the warning signal.

13. A method of operating an electronic transmission, wherein the electronic transmission comprises a transmission main body and a transmission power supply to provide the transmission main body with power required for operation; comprising the steps of:
- turning on the electronic transmission, and initializing settings;
- performing in an operating mode;
- detecting whether a shutdown command, a setup command, or a shifting command is received;
- performing the following steps according to the received command:
- if the shutdown command is received, shutting down the electronic transmission;
- if the setup command is received, exiting the operating mode, and performing in the setup mode; wherein during performing in the operating mode, detecting whether to receive a command for exiting the setup mode; if said command is received, exiting the setup mode, and returning to perform in the operating mode; if said command is not received, detecting whether any command has been received for a predetermined period;
- wherein if a period for which no command has been received has not yet exceeded the predetermined period, continuing performing in the setup mode; if the period has already exceeded the predetermined period, detecting whether a standby function is executed; wherein if the standby function is not executed, shutting down the electronic transmission; if the standby function is executed, exiting the setup mode, and performing in the standby mode;
- wherein in a standby mode, detecting whether any command is received, which consumes energy that is less than the energy consumed in the operating mode; if said command is not received, continuing performing in the standby mode; if said command is received, exiting the standby mode, and returning to perform in the operating mode;
- if the shifting command is received, detecting a voltage of the transmission power supply, and then determining whether the voltage of the transmission power supply is greater than a minimum reference voltage; if the voltage is greater than the minimum reference voltage, controlling the transmission main body to operate based on the shifting command; if the voltage is less than the minimum reference voltage, detecting whether the shutdown command is received within a predetermined period without controlling the transmission main body to operate; wherein if the shutdown command is received, shutting down the electronic transmission; if the shutdown command is not received, detecting whether the standby function is executed; wherein if the standby function is not executed, shutting down the electronic transmission; if the standby function is executed, performing in the standby mode.

14. The method of claim 13, wherein in the operating mode, if none of the shutdown command, the shifting command, or the setup command has been received for a predetermined period, detecting whether the standby function is executed; if the standby function is not executed, shutting down the electronic transmission; if the standby function is executed, performing in the standby mode.

15. The method of claim 13, further comprising the steps of:
- after detecting the voltage of the transmission power supply, displaying the voltage of the transmission power supply by a display element.

16. The method of claim 15, wherein the display element displays the voltage of the transmission power supply by showing lights, text, voltage value, voltage interval, percentage of electricity, or remaining number of times for shifting.

17. The method of claim 13, wherein if the voltage of the transmission power supply is equal to the minimum reference voltage, controlling the transmission main body to operate based on the shifting command.

18. The method of claim 13, wherein if the voltage of the transmission power supply is equal to the minimum reference voltage, determining whether the shutdown command is received without controlling the transmission main body to operate.

19. The method of claim 13, wherein if the voltage of the transmission power supply is not greater than the minimum reference voltage, generating a warning signal to inform a user that the voltage of the transmission power supply is insufficient.

20. The method of claim 13, wherein the electronic transmission further comprises a shifting controller for generating the shifting command, and a controller power supply for providing the shifting controller with power required for operation;
- wherein if the voltage of the transmission power supply is greater than the minimum reference voltage, detecting a voltage of the controller power supply, and determining whether the voltage of the controller power supply is less than a warning voltage;
- wherein if the voltage of the controller power supply is less than the warning voltage, generating a warning signal to inform a user that the voltage of the controller power supply is insufficient.

21. The method of claim 20, further comprising the steps of:
- after detecting the voltage of the controller power supply, displaying the voltage of the controller power supply by a display element.

22. The method of claim 21, wherein the display element displays the voltage of the controller power supply by showing lights, text, voltage value, voltage interval, percentage of electricity, or remaining number of times for shifting.

23. The method of claim 20, wherein if the voltage of the controller power supply is equal to the warning voltage, generating the warning signal.

* * * * *